United States Patent [19]

Ashcroft et al.

[11] 4,250,405

[45] Feb. 10, 1981

[54] APPARATUS FOR IDENTIFYING PRODUCTION CODES ON ARTICLES

[75] Inventors: Richard I. Ashcroft, Harpenden; David Kaktovics, Gainsborough; Anthony E. P. Monson, Bushey; David M. Weeks, Luton, all of England

[73] Assignee: United Glass Limited, Staines, England

[21] Appl. No.: 89,561

[22] Filed: Oct. 29, 1979

[30] Foreign Application Priority Data

Oct. 30, 1978 [GB] United Kingdom ............... 42379/78

[51] Int. Cl.[3] ........................ G06K 7/14; G06K 19/06

[52] U.S. Cl. .................................... 235/456; 235/464; 235/494

[58] Field of Search ............... 235/454, 494, 490, 456, 235/462, 464; 250/455, 466, 468, 469

[56] References Cited

U.S. PATENT DOCUMENTS

| | | | |
|---|---|---|---|
| 3,418,456 | 12/1968 | Hamisch et al. | 235/494 |
| 3,636,317 | 1/1972 | Torrey | 235/494 |
| 3,757,090 | 9/1973 | Haefeli et al. | 235/494 |
| 3,761,725 | 9/1973 | Meyer | 235/494 |
| 3,898,433 | 8/1975 | Sallet | 235/454 |
| 3,923,158 | 12/1975 | Fornåå | 235/454 |

*Primary Examiner*—Daryl W. Cook

*Attorney, Agent, or Firm*—Cushman, Darby & Cushman

[57] ABSTRACT

The apparatus is particularly suited for identifying mould cavity numbers formed in binary code in the stippling on the base of glass containers. It comprises light beam detection means (2), such as a photodiode array, which scans an area of the article to provide an output characteristic of the code; means (12) are provided for creating at least one window in time within each scan period by selecting which diodes in the array commence and terminate the window. Only output signals from the light beam detection means within the window in time are decoded to provide the code on the article. Preferably, the window is selected manually, e.g. by thumbwheel stores (14), and, further, a true decoding is arranged to arise for "1" in the binary code (presence of a stippling mark) only if a predetermined number of photodiodes within the window are activated at any one time. This true decoding reduces errors due to refraction of light from defects in the glass. The predetermined number of photodiodes may also be selected manually e.g. by thumbwheel stores (22).

9 Claims, 4 Drawing Figures

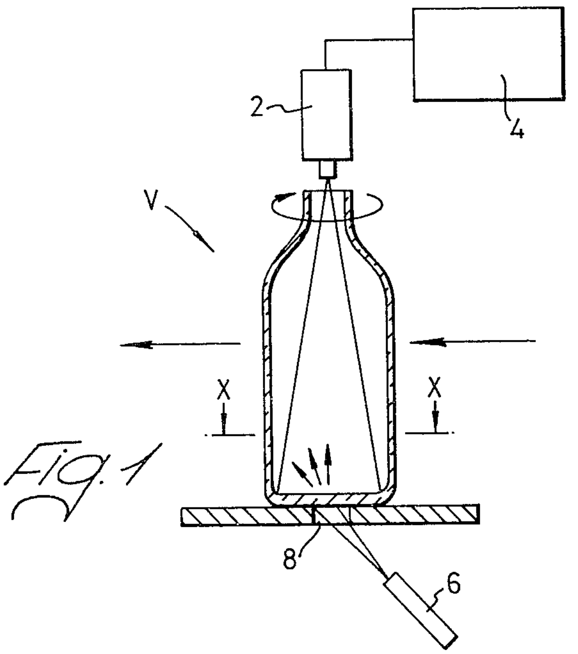
Fig. 1
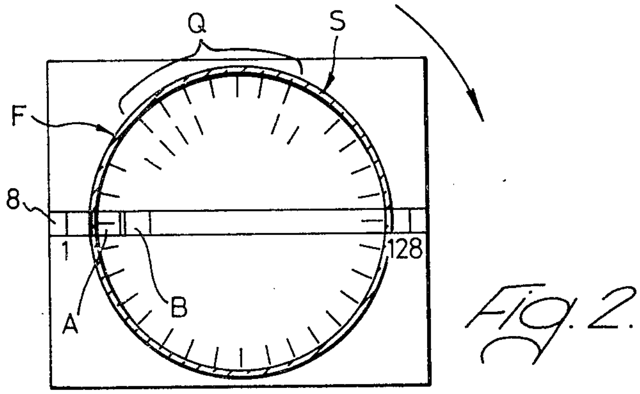
Fig. 2.
Fig. 3.
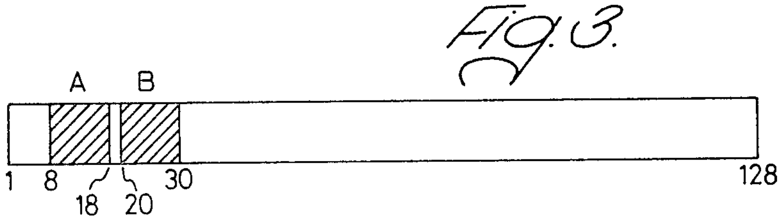

APPARATUS FOR IDENTIFYING PRODUCTION CODES ON ARTICLES

This invention relates to an apparatus for identifying production codes appearing on articles, such as on glass bottles.

Many articles of commerce are produced on machines, several of which may be working in parallel and supplying their products onto a common production line. These machines may on occasion develop defects and provide products with faults onto the production line. Since these machines often work at high speed, a large number of faulty products may be on the production line, divorced from the defective machine, before the latter is remedied. In the past much manual labour has been employed to inspect products on such lines and to remove the faulty articles.

As industry becomes more sophisticated, products are now often coded with various marks to enable the machine on which they were produced to be readily-identified. Apparatus has been developed in some industries for automatically reading these codes to enable corrective action over faults to be speedily taken.

An example is in the production of glass bottles, where a large number of glass bottle moulding machines are simultaneously supplying moulded bottles onto a conveyor which subsequently transports them to a lehr for annealing. It is common practice to mark the moulds in some manner so that the bottles they produce are unique—typically each mould cavity includes an area which moulds a cavity, or mould number onto the bottle base. This number (or other code if employed) is normally provided as a marking on the bottle base which is in addition to the normal ring of stippling present around the periphery of the base of such bottles.

Such cavity numbers can be coded onto the base of glass containers by incorporating the code in the stippling itself. The coding is provided by means of stipple marks or bars, existing in two or more adjacent lines. With bottles of circular cross section, the coding would be, for example, a series of stipple marks existing as radial lines in two concentric rings with the presence or absence of bars in predetermined positions providing the detail of the code.

The present invention is concerned with an apparatus for identifying production codes such as those described and is particularly, but not exclusively, concerned with apparatus for identifying cavity code numbers provided on glass bottles.

According to the invention there is provided an apparatus for identifying a production code appearing on an article, which comprises light beam detection means responsive to light from a source of illumination and which has been reflected or refracted from a production code on an article, scanning means to enable the light beam detection means to scan the article whereby an output signal characteristic of the code is provided, means for creating at least one window in time within each scan period, detection means responsive to the window creation means and to the light beam detection means to provide a signal characteristic of any code marks detected during only the window in time, and means responsive to the detection means for decoding the signals therefrom to provide an indication of the code on the article.

Preferably the light beam detection means is a photodiode array camera arranged to scan an area of the article on which code marks have been placed. Desirably the code marks are in at least two distinct parts (e.g. radial marks placed in two concentric rings on the base of the article) and a corresponding number of windows in time are created within the scan period. The windows are created at a time to enable the distinct parts of the code to be separately detected and subsequently processed. For example, with a two part code where the first part is detected by the camera early during the scan period and the second part later in the scan period, an early time window is created coincident with the scanning of the first code part, and a later time window is created coincident with the scanning of the second code part. Separate channels may then be employed for processing of the code parts, whereafter the processed signals are combined to give the full code information.

Preferred features of the invention will now be described with reference to the accompanying drawings, given by way of example, wherein:

FIG. 1 is a schematic cross-section of an apparatus for identifying mould cavity numbers on glass bottles;

FIG. 2 is a cross-section along the line X—X of FIG. 1;

FIG. 3 is a diagram to illustrate schematically the windows in time; and

Figure 4:
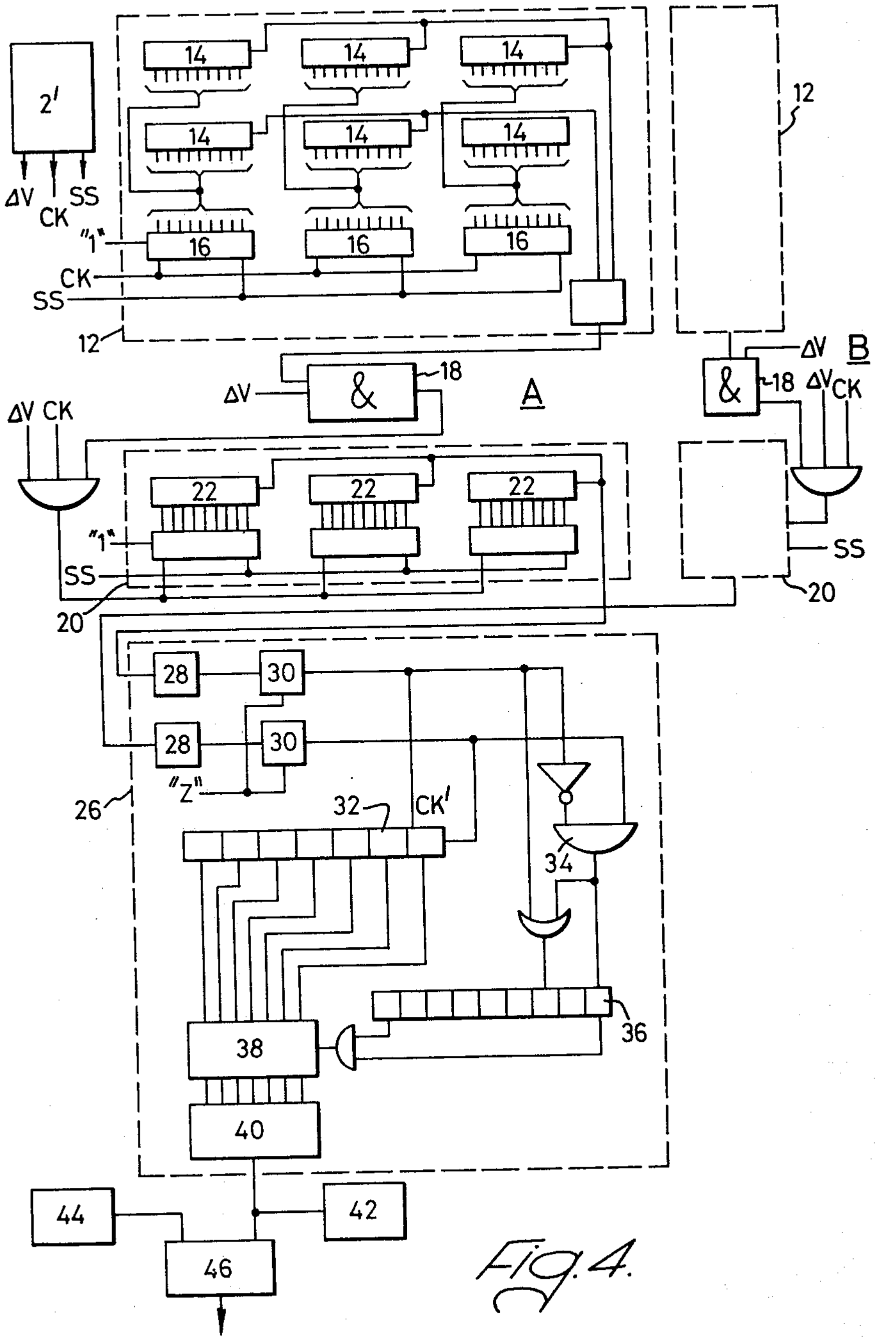
FIG. 4 is a schematic diagram showing electronic circuitry employed in the apparatus.

Referring to FIG. 1, the identification apparatus comprises a linescan photodiode array camera 2 (such as one obtainable from Integrated Photomatrix Ltd, Dorchester, Dorset) which views down onto a conveyor line along which glass bottles, in production, are moving. Each of the bottles moves through a viewing station, V, in the direction indicated by the right-to-left arrows. The camera is disposed to look down through the neck of each bottle and is focussed on the base thereof. The camera is used to control electronics 4 described in more detail below. A source of illumination 6 is projected upwardly at about 45° relative to the camera axis, with the illumination passing through a slit 8 before striking the bottle base. Each bottle is arranged to sit, at the viewing station, with the slit diametrically traversing its base. Each bottle received at the viewing station is rotated (by means not shown) so that all the bottle base passes across the slit before leaving the viewing station.

In the absence of any irregularities on the base of the bottle, the light from source 6 is not detected to any substantial extent by camera 2, but when such light does strike protrusions or indentations (such as the stippling normally present on the bottle base) the light is refracted upwardly to increase the illumination seen by the photodiodes of the camera.

FIG. 2 illustrates schematically the plan view on section X—X shown in FIG. 1. The stippling on the base of the bottles incorporates a code indicating the number of the mould cavity in which the bottle was produced. A seven character binary code "Q" is employed to define cavity, or mould, number and the adjacent "S" and "F" marks are employed respectively to indicate the start and finish of the code. As the bottle is rotated at the viewing station, this nine character code in the stippling is detected by the camera and appropriately decoded by the electronics. The code selected for illustration in FIG. 2 is explained as follows. The absence of a stippling mark in the outer circumferential ring ("0") plus the presence of a mark in the inner ring ("1"), i.e. "01", are employed as start and finish flags in the electronics. The seven characters between S and F (the Q code) can be represented as either 10 or 11 (with the outer ring again being quoted as the first bit of these two bit numbers) and the second binary bit in each Q character (i.e. the inner bit) is employed to construct a seven bit binary number corresponding to cavity number. This seven bit number is thus created from the presence ("1") or absence ("0") of stippling marks in the inner circumferential ring, between the S and F positions. Thus, as illustrated, the full code seen by the camera is 01 (S); 11, 10, 10, 10, 11, 11, 11; 01 (F). This decodes to a binary cavity number of 1000111, i.e. cavity number 71.

The camera 2 as described (FIG. 1) includes a linear array of 128 photodiodes sequentially scanned at high speed. In terms of the scanning area involved, these typically extend from the numbers 1 to 128 as shown in FIG. 2. Many of these diodes are redundant for decoding purposes since one half of the character information is obtainable just in the area indicated as A and the other half in area B.

Theoretically, it would be possible to detect the information in either the A or B areas with a single photodiode in each area, but this is too imprecise since it is likely to give false readings. A false reading is possible from a bottle imperfection or from the circular baffle ring which is present on the base of many glass bottles. In order to ensure accurate code detection, it is arranged for a number of diodes within the A and B areas to be actively associated with the detection of the code.

Referring to FIG. 3, for the purposes of this invention it will be assumed that 11 photodiodes are associated with detection in each area. For the A area, these might be (as illustrated) the eighth to eighteenth diodes, and for the B area the twentieth to thirtieth diodes. Although the areas are shown spaced apart (in the sense that the nineteenth diode is not employed) it is feasible for the areas to be adjacent or even to overlap.

The electronic circuitry employed to detect and decode the stipple coding is illustrated schematically in FIG. 4. Only the more important electronic components are illustrated for clarity.

The output from the camera electronics, 2', consists of three signals—a start scan pulse signal SS (a pulse being supplied each time a scan of the 128 photodiodes commences), a clock pulse signal CL (synchronous with the scanning of each photodiode) and a video output signal. The video output signal is an analog signal representative of the light intensity received by the scanned (and interrogated) photodiodes. This analog signal is converted to digital form by comparing the analog signal to a preset level in a level detector, so providing "on" signals above the level, but "off" signals below the level. The present level is selected so that the absence of stippling within the viewing area of any photodiode provides an "off" signal and the presence of stippling and or coding marks provides an "on" signal.

The first section of the detecting and decoding equipment is in two channels, one for the A area and the other for the B area. Since these channels are identical, only the A channel will be described.

The start scan and clock pulses SS and CK are supplied to a window creator 12, the purpose of which is to create a window in time appropriate to the "scan-on" period for the diodes selected for the A half of the detection (in this example the eighth to eighteenth diodes). This window is obtained by setting the largest and smallest diode numbers selected (8 and 18) respectively in two sets of thumbwheel stores 14 and by clocking a continuous-series of "1"'s through a shift register 16. The shift register 16 is clocked by the clock pulses CK and cleared by the start scan pulses SS. The states of the shift register stages are compared to the numbers held by stores 14 and a pulse output provided, which pulse commences just as the eighth diode is scanned and which finishes when the scanning of the eighteenth diode terminates.

The output of the window creator and the squared video output of camera electronics 2', ΔV are supplied to a diode detector 18. These two outputs are ANDed by the detector 18 so that the latter detects the presence only of "on" diodes within the window selected. The output of the detector is a series of pulses corresponding in number to the number of "on" diodes within the window.

The output of the diodes detector 18 is supplied to a diode discriminator 20, which is employed to count the number of "on" diodes within the window. As already explained, code detection by use of just one photodiode for each of the A and B areas is not practical, and the discriminator is employed to define a predetermined number of diodes, within each window, which must be "on" simultaneously before the information is decoded as true. In the example employed, a total of eleven diodes have been selected to create each window and it may be decided that the simultaneous presence of an "on" signal on any eight of these eleven would provide the sufficient accuracy to enable the information to be decoded as true. To put this principle into operation, the discriminator 20 includes a thumbwheel store 22 in which is preset the number of diodes that must be "on" within the window before the information is decoded as true. In the example given, the thumbwheel store 22 would hold the number "8".

The output of the diode detector 18 is ANDed with the ΔV and CK pulses from the camera electronics 2' and employed to clock a shift register 24. This shift register is cleared by the SS pulses and has a continuous-series of "1"'s clocked therethrough. In principle both sets of shift registers 16 and 24 function in an identical manner. The diode discriminator 20 compares the number of "on" stages within the window to the number held by store 22.

At this stage it is appropriate to explain that the number of times each "piece" of stippling is scanned is determined by the speed at which the linear array of photodiodes is interrogated and by the rotational speed of the bottle. Typically, there may be four scans per stipple piece as the piece traverses the line of sight of the camera. Moreover, since the stipple piece is moving during the scanning, the scanning of any piece of stipple may be considered as arising in lines disposed at an oblique angle to the radius of the bottle 8. Thus, during the four scans of each stipple piece, different ones of the diodes within the window selected will probably be illuminated in each scan.

Thus, as a stipple piece first comes into the area, A, of view, possibly only one diode within the 8–18 window will be on. This information would be passed to the diode discriminator 20 but would be blocked as false since the number of diodes required to be on had not been achieved. On the second scan possibly four diodes will be on and this information will also be rejected. On the third scan possibly nine diodes will be on and this information would be accepted by the diode discriminator as true.

When the information received in each scan by the diode discriminator is determined as false, the shift register 24 clears and the information held therein is not passed on to its output. However, once a scan arises where a true condition exists, then this information is passed to a decoder 26.

The decoder 26 receives outputs from both A and B channels and initially stores the information ("0" in the absence of a signal from a discriminator 20, "1" when a true condition has been detected by a discriminator 20) in A and B stores 28. The condition of stores 28 is then passed through gates 30 with the contents of the B store 26 entering a seven stage shift register 32. The A store 26 is supplied to one input of an AND gate 34, the other input of which is the inverted contents of B store 26. The AND gate 34 supplies a nine stage shift register 36, the first and last stages of which and ANDed, and which control gate 38—which receives the contents of the seven stage shift register 32. The outputs of the control gate 38 are supplied to a binary-to-decimal decoder 40. The gates 30 are opened by a zero signal "Z" which is generated when there is an absence of signals in both windows (i.e. the ΔV is "off" in both windows). Such a condition exists between the stippling and/or coding marks.

The decoder 26 operates as follows. The only time that the A store 28 will hold "0" and the B store 28 will hold "1" is for the S and F characters in the code. This unique condition is accepted and passed, as "1", by gate 34 to nine stage shift register 36. The first "1", corresponding to the S character is clocked down the nine stage shift register 36 as each subsequent piece of stippling (or "1") is detected and decoded as true in the A area. Simultaneously the contents of the B store 28 are clocked down the seven stage register 32. The clocking of shift register 32 is obtained from the "1"'s passing through the A store 28 (line CK'). The clocking of Shift register 36 is obtained either from CK' signal or from the AND gate 34 output. When the F character is detected in the A and B areas, a further "1" will be inserted into the nine stage shift register. At this time the seven stage shift register will hold a binary number obtained just from the B area, or channel, and corresponding to the cavity number in which the bottle was moulded. The two "1"'s in the nine stage shift register will be in the first and ninth stages and will cause gate 38 to open and transfer the contents of the seven stage register to the binary-to-decimal decoder 40.

The decoder 40 drives a decimal display 42 which is a visual display of the cavity number decoded.

The information obtained from decoder 40 may be employed for a variety of purposes, but typically it is employed to control apparatus for rejecting or marking bottles moulded in cavities known to be faulty for some reason. To this end, a defective cavity number store 44 is provided. This may be a series of thumbwheels enabling the production line operator to set up the decimal numbers of cavities known to be producing, at that instant in time, faulty bottles. The number supplied by decoder 40 is compared to the numbers held by store 44 in a comparator 46 and, in the event of a coincidence of numbers, an output signal is supplied from the comparator. This signal can be employed to remove the faulty bottle from the production line (e.g. just downstream of the viewing station) or to mark the bottle distinctively so that it can be easily identified and removed further down the production line.

The apparatus described is sufficiently compact that it can be incorporated conveniently in a glass bottle production line.

Although the invention has been explained in relation to the production of circular cross-section glass bottles, it is not restricted thereto. The invention can find utility in the production of glass containers of other shapes. The invention can also be employed in relation to other articles and is not exclusively restricted to glass articles.

We claim:

1. An apparatus for identifying a production code appearing on an article, which comprises light beam detection means responsive to light from a source of illumination and which has been reflected or refracted from a production code on an article, scanning means to enable the light beam detection means to scan the article whereby an output signal characteristic of the code is provided, means for creating at least one window in time within each scan period, detection means responsive to the window creation means and to the light beam detection means to provide a signal characteristic of any code marks detected during only the window in time, and means responsive to the detection means for decoding the signals therefrom to provide an indication of the code on the article.

2. An apparatus according to claim 1 wherein the window creation means includes means for manually setting each said window in time within each scan period.

3. An apparatus according to claim 1 wherein said decoding means includes means for decoding as true information the signals from the detection means, for one type of code mark on the scanned article, only when a predetermined portion of the signal within said window satisfies the decoding criterion for said type of code mark.

4. An apparatus according to claim 3 wherein said true information decoding means includes means for manually setting the predetermined amount.

5. An apparatus according to claim 1 wherein said window creation means creates two windows in time in each scan period whereby to enable a first and a second series of code marks to be detected and decoded.

6. An apparatus according to claim 5 wherein said detection means is arranged to detect start and finish code marks in said first series of code marks, and said decoding means is responsive to signals generated by said detection means detecting said start and finish code marks whereby to decode a production code from said second series of code marks.

7. An apparatus according to claim 1 wherein said light beam detection means comprises a light-responsive semiconductor array wherein each semiconductor in the array is sequentially interrogated whereby to scan an area of the article, and said window creation means creates the or each window in time by selecting particular ones of said semiconductors to commence and terminate said window in time.

8. An apparatus according to claim 1 wherein said decoding means supplies its output to a comparator for comparison with the output of a production code store, said comparator providing an output in the event of a coincidence of compared codes.

9. An apparatus for identifying mould cavity code numbers on glass containers which comprises an apparatus as claimed in claim 1.

* * * * *